United States Patent
Park

(10) Patent No.: US 8,049,833 B2
(45) Date of Patent: Nov. 1, 2011

(54) LIQUID CRYSTAL DISPLAY DEVICE

(75) Inventor: Sang Hyun Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 193 days.

(21) Appl. No.: 12/619,663

(22) Filed: Nov. 16, 2009

(65) Prior Publication Data

US 2010/0165234 A1 Jul. 1, 2010

(30) Foreign Application Priority Data

Dec. 27, 2008 (KR) ........................ 10-2008-0135065

(51) Int. Cl.
    *G02F 1/1333* (2006.01)
(52) U.S. Cl. ............................ 349/58; 362/632; 362/634
(58) Field of Classification Search ...................... 349/58
    See application file for complete search history.

(56) References Cited

U.S. PATENT DOCUMENTS

| 7,106,393 | B2* | 9/2006 | Lee | 349/58 |
| 7,182,500 | B2* | 2/2007 | Sugawara | 362/634 |
| 7,764,331 | B2* | 7/2010 | Choi et al. | 349/58 |

* cited by examiner

*Primary Examiner* — Richard Kim
(74) *Attorney, Agent, or Firm* — Birch, Stewart, Kolasch & Birch, LLP

(57) ABSTRACT

An LCD device with a simplified configuration is disclosed. The LCD device includes a reflection sheet configured to include an opened upper surface, a plurality of first supporters formed to inwardly project from the side walls of the reflection sheet, a bottom cover configured to receive the reflection sheet, a plurality of second supporters formed to inwardly project from the side walls of the bottom cover, and optical sheets disposed on the reflective sheet and configured to include a plurality of fixed protrusions which are formed to outwardly project from the edges of the optical sheets. The edges of a lower surface of a liquid crystal display panel are placed on the first supporters, and the fixed protrusions of the optical sheets are placed on the second supporters.

8 Claims, 3 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2008-0135065, filed on Dec. 27, 2008, which is hereby incorporated by reference in its entirety.

BACKGROUND

1. Field of the Disclosure

This disclosure relates to a liquid crystal display device, and more particularly to a liquid crystal display device with a simplified configuration.

2. Description of the Related Art

Liquid crystal display (LCD) devices are widening their application fields as a result of their features, such as their light weight, slimness, low driving voltage, and so on. This trend is evident in the ways in which the LCD devices have been applied to office automation equipment, audio equipment, video equipment, and more. The LCD device controls a transmitting amount of light on the basis of image signals applied to a plurality of control switches, in order to display a picture.

The LCD device, which is not self-luminescent, includes a backlight unit irradiating light on the rear surface of an LCD panel in which a picture is displayed. The backlight unit is classified as either an edge type or a direct type in accordance with the disposition of its light source.

The edge type backlight unit includes a light source which is disposed in a position corresponding to one side of the LCD panel. Also, the edge type backlight unit irradiates light emitted from the light source onto the entire surface of the LCD panel using a light guide panel. On the other hand, the direct type backlight unit includes a plurality of light sources arranged opposite the rear surface of the LCD panel. These plural light sources apply light directly to the rear surface of the LCD panel. The direct type backlight unit has a higher brightness and a wider luminescent surface than the edge type backlight unit because it employs a plurality of light sources. In addition, this backlight unit can become larger in size corresponding to the increased size of the LCD device. In view of these points, direct type backlight units are widely used in LCD devices.

The direct type backlight unit included in a related art LCD device is configured to include a plurality of light sources arranged at fixed intervals on the rear surface of an LCD panel. The direct type backlight unit further includes a diffusion plate and optical sheets sequentially disposed to diffuse and converge light over the plurality of light sources.

To rectify this, the related art LCD device must be configured to include a plurality of components forming the backlight unit and a panel guider which supports the LCD panel and is secured to the backlight unit. As such, the related art LCD device has a complicated configuration, and it is very difficult to keep slim.

BRIEF SUMMARY

Accordingly, the present embodiments are directed to an LCD device that substantially obviates one or more of problems due to the limitations and disadvantages of the related art.

An object of the present embodiment is to provide an LCD device with a simplified configuration.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a reflection sheet configured to include an opened upper surface; a plurality of first supporters formed to inwardly project from the side walls of the reflection sheet; a bottom cover configured to receive the reflection sheet; a plurality of second supporters formed to inwardly project from the side walls of the bottom cover; and optical sheets disposed on the reflective sheet and configured to include a plurality of fixed protrusions which are formed to outwardly project from the edges of the optical sheets. The edges of a lower surface of a liquid crystal display panel are placed on the first supporters, and the fixed protrusions of the optical sheets are placed on the second supporters.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
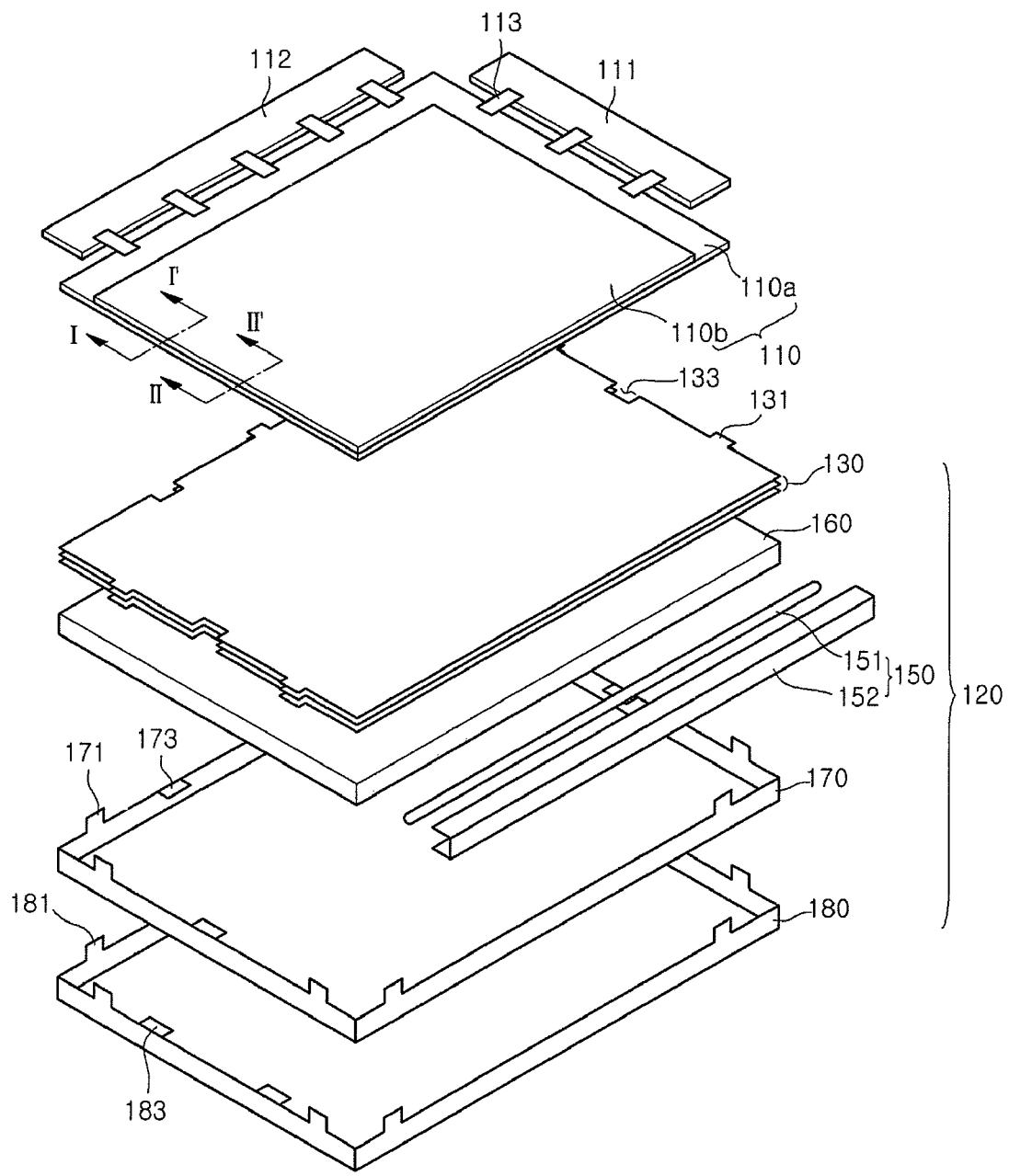
FIG. 1 is a disassembled perspective view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a disassembled perspective view showing an LCD device according to an embodiment of the present disclosure.

Figure 2:
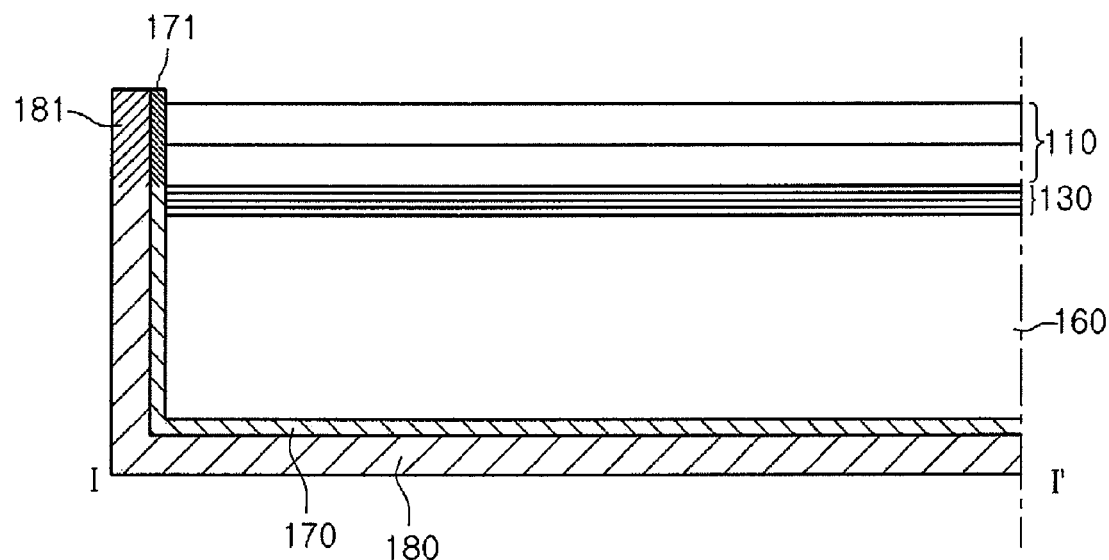
FIG. 2 is a cross-sectional view showing an LCD device taken along the line I-I' of FIG. 1.
Figure 3:
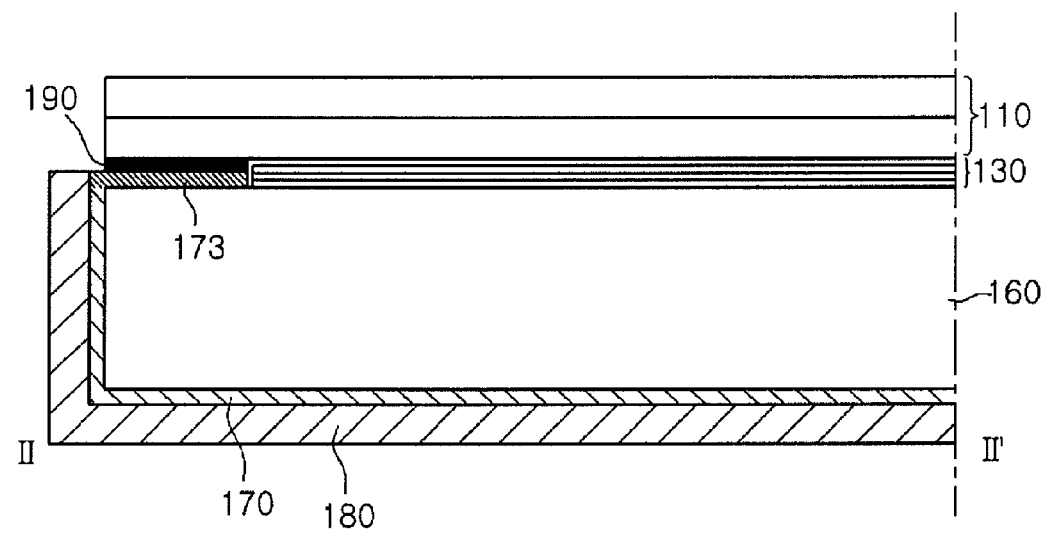
FIG. 3 is a cross-sectional view showing an LCD device taken along the line II-II' of FIG. 1.
Figure 4:
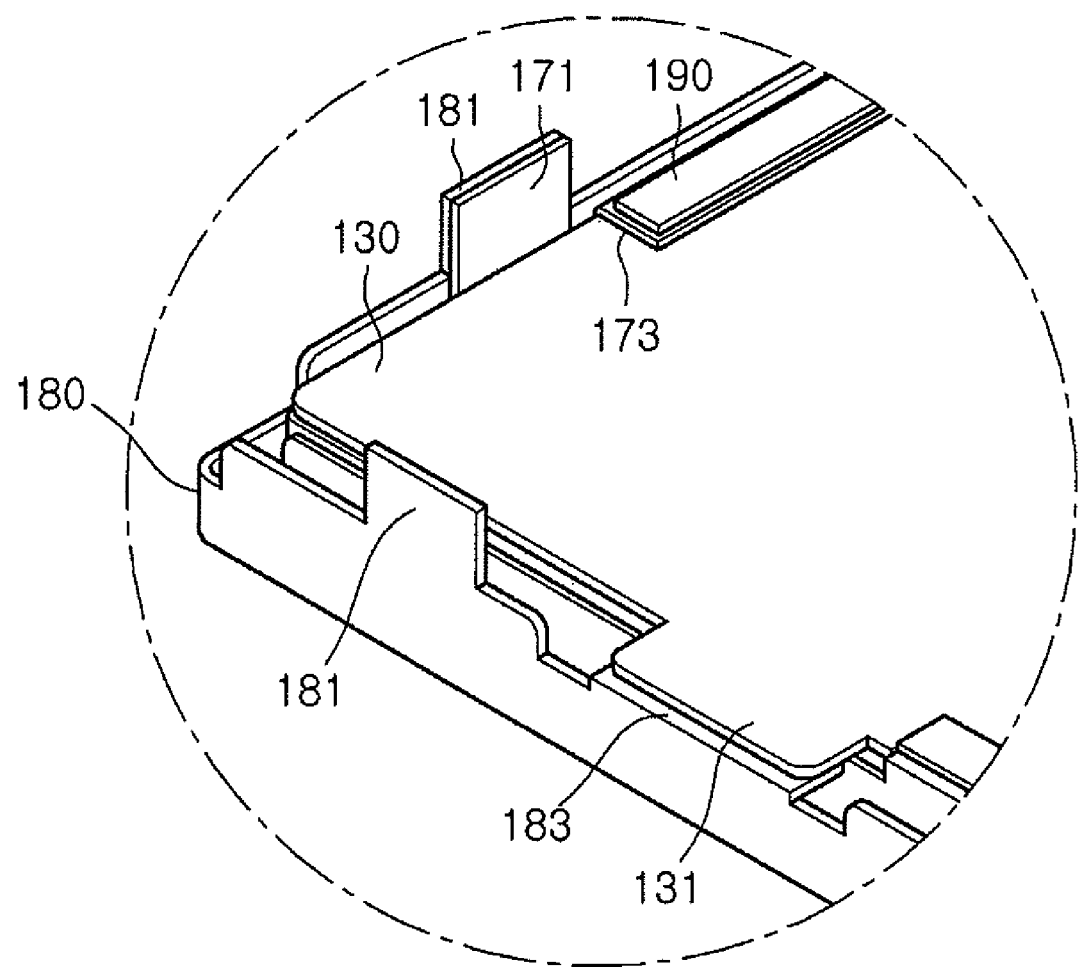
FIG. 4 is a perspective view showing the combined state of a backlight unit which is included in an LCD device according to an embodiment of the present disclosure.

FIG. 2 is a cross-sectional view showing an LCD device taken along the line I-I' of FIG. 1, and FIG. 3 is a cross-sectional view showing an LCD device taken along the line II-II' of FIG. 1. FIG. 4 is a perspective view showing the combined state of a backlight unit which is included in an LCD device according to an embodiment of the present disclosure.

As shown in FIGS. 1 to 4, an LCD device according to an embodiment of the present disclosure includes an LCD panel 110 configured to display an image, and a backlight unit 120 disposed under the LCD panel 110. The backlight unit 120 applies light to the LCD panel 110.

Although it is not shown in detail in the drawings, the LCD panel 110 includes a thin film transistor substrate 110a and a color filter substrate 110b disposed opposite each other and combined to maintain a cell gap between them, as well as a liquid crystal layer interposed between the substrates 110a and 110b. On the thin film transistor substrate 110a, a plurality of gate lines are formed, a plurality of data lines are formed to cross the plurality of gate lines, and a plurality of transistors TFT are formed at the intersections of the plurality of gate lines and the plurality of data lines. The color filter substrate 110b includes a plurality of red, green, and blue (RGB) color filters and a black matrix. Each of the color filters is formed on their respective pixel. The black matrix is formed on the edges of the pixels.

The LCD device further includes a gate driving PCB (printed circuit board) 111 and a data driving PCB 112 disposed by the sides of the LCD panel 110. The gate driving PCB 111 sequentially applies a scan signal to the gate lines on the LCD panel 110. The data driving PCB 112 applies data signals to the data lines on the LCD panel 110. The gate and data driving PCBs 111 and 112 are electrically connected to the LCD panel 110 by means of COFs (chip on film) 113. The COFs 113 can be replaced with tape carrier packages (TCPs).

The backlight unit 120 will be explained using an edge type backlight unit as an example.

The backlight unit 120 includes a box-shaped bottom cover 180 with an opened upper surface, a reflection sheet 170 with an opened upper surface disposed on the bottom cover 180, a light source portion 150 disposed at one edge of the inner side of the bottom cover 180, a light guide plate 160 disposed parallel to the light source portion 150, and an optical sheet 130 disposed on the light guide plate 160. The light guide plate 160 converts linear light into two-dimensional light. The optical sheets 130 force light to be diffused and converged.

The light source portion 150 includes a light source 151, and a light source housing 152. The light source housing 152 is configured to encompass the light source 151 and have an opened surface opposite to one side surface of the light guide plate 160. An example of the light source 151 becomes an external electrode fluorescent lamp (EEFL) with electrodes encompassing both ends of it. Although the EEFL is used as the light source 151, the present embodiment is not limited to this. In other words, a cold cathode fluorescent lamp (CCFL) or a light emission diode can be used as the light source 151.

The optical sheets 130 include a diffusion sheet configured to diffuse light emitted from the light guide plate 160, a convergent sheet configured to concentrate the diffused light from the diffusion sheet onto the liquid crystal LCD panel 110, and a protective sheet disposed on the convergent sheet and configured to protect the convergent sheet. These optical sheets include a plurality of fixed protrusions 131 configured to project outwardly from their edges, and a plurality of receptive recesses 133 formed to extend inwardly from their edges. The plurality of fixed protrusions 131 are arranged in fixed intervals and are fastened to the bottom cover 180. The plurality of fixed protrusions 131 and the plurality of receptive recesses 133 are formed in a single body united with each of the optical sheets 130, when the optical sheets 130 are manufactured.

The reflection sheet 170 includes a plurality of first guide protrusions 171 configured to project upwardly from its side walls and separated in the fixed intervals from one another, and a plurality of first supporters 173 configured to project inwardly from its side walls and also separated in the fixed intervals from one another. The plurality of first guide protrusions 171 and the plurality of first supporters 173 are formed in a single body united with the reflection sheet 170 when the reflection sheet 170 is manufactured.

The bottom cover 180 includes a plurality of second guide protrusions 181 configured to project upwardly from its side walls and separated in fixed intervals from one another, and a plurality of second supporters 183 configured to project inwardly from its side walls and separated in fixed intervals from one another. The plurality of second guide protrusions 181 and the plurality of second supporters 183 are formed in a single body united with the bottom cover 180 when the bottom cover 180 is manufactured.

A plurality of light shading tapes 190 are attached on the upper surfaces of the first supporters 173 inwardly bent from the side walls of the reflection sheet 170, respectively. The first supporters 173 are used for supporting the edges of the LCD panel 110. Also, the plurality of first supporters 173 are inserted into the respective receptive recesses 133 formed on the edges of the optical sheets 130. As such, the receptive recess 133 is preferably formed to have a larger size than the first supporter 173.

One surface of the light shading tape 190 comes in face contact with the upper surface of the first supporter 173, and the other surface of the light shading tape 190 comes in face contact with the edge of the lower surface of the LCD panel 110. Also, the light shading tape 190 is used for securing the reflection sheet 170 and the LCD panel 110. To this end, the light shading tape 190 is configured with adhesive materials coated on both its surfaces. Moreover, the light shading tapes 190 block light emitted to the edges of the backlight unit 120, thereby preventing an edge light leakage phenomenon.

The second supporters 183 are formed to bend inwardly from the side walls of the bottom cover 180. The second supporters 183 of the bottom cover 180 support the respective fixed protrusions 131 of the optical sheet 130. In other words, the second supporters 183 of the bottom cover 180 are used for supporting the optical sheets 130.

Although they are not shown in detail in the drawings, a plurality of adhesive tape is attached on the second supporters 183, respectively. One surface of each adhesive tape comes in face contact with the upper surface of each second supporter 183, and the other surface of each adhesive tape comes in face contact with the lower surface of each fixed protrusion of the optical sheets 130.

The first guide protrusions 171 of the reflection sheet 170 are opposite to the second guide protrusions 181 of the bottom cover 180, respectively. The first and second guide protrusions 171 and 181 are used for guiding the side surfaces of the LCD panel 110. As such, the first and second guide protrusions 171 and 181 projected from the side walls of the reflection sheet 170 and the bottom cover 180 are preferably formed to have a larger height than the thickness of the LCD panel 110.

Although the present disclosure has been briefly explained regarding only a single embodiment described above, it is not limited to this. The first guide protrusions 171 and the first supporters 173 of the reflection sheet 170 and the second guide protrusions 181 and the second supporters 183 of the bottom cover 180 can be changed in number and shape.

As described above, the LCD device according to an embodiment of the present disclosure enables the first supporters 171 of the reflection sheet 170 to support the LCD panel 110, as well as the second supporters 183 of the bottom cover 180 to support the optical sheets 130. The LCD device forces the first and second guide protrusions 171 and 181 to the side surfaces of guide the LCD panel 110. Therefore, a panel guider included in an LCD device of the related art can be removed. As a result, the LCD device of the present embodiment can reduce its manufacturing costs and can enhance slimness. In other words, the LCD device according to an embodiment of the present disclosure simplifies its configuration, thereby reducing its manufacturing costs and enhancing slimness.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device comprising:
   a reflection sheet configured to include an opened upper surface;
   a plurality of first supporters formed to inwardly project from side walls of the reflection sheet;
   a bottom cover configured to receive the reflection sheet;
   a plurality of second supporters formed to inwardly project from side walls of the bottom cover; and
   optical sheets disposed on the reflective sheet and configured to include a plurality of fixed protrusions which are formed to outwardly project from edges of the optical sheets,
   wherein edges of a lower surface of a liquid crystal display panel are placed on the first supporters, and the fixed protrusions of the optical sheets are placed on the second supporters.

2. The liquid crystal display device claimed as claim 1, further comprising a plurality of light shading tapes each disposed on the respective first supporters.

3. The liquid crystal display device claimed as claim 2, wherein the light shading tape includes one surface configured to come in face contact with an upper surface of the first supporter, and the other surface configured to come in face contact with the edges of the lower surface of the liquid crystal display panel.

4. The liquid crystal display device claimed as claim 2, further comprising an adhesive material coated on both surfaces of the light shading tape.

5. The liquid crystal display device claimed as claim 1, further comprising a plurality of first guide protrusions configured to upwardly project from the side walls of the reflection sheet and guide side surfaces of the liquid crystal display panel.

6. The liquid crystal display device claimed as claim 1, further comprising a plurality of second guide protrusions configured to upwardly project from the side walls of the bottom cover and guide the side surfaces of the liquid crystal display panel.

7. The liquid crystal display device claimed as claim 1, further comprising a plurality of adhesive tapes disposed on the respective second supporters.

8. The liquid crystal display device claimed as claim 1, wherein the first supporters are opposite to a plurality of receptive recesses formed on the edges of the optical sheets, respectively.

* * * * *